A. NEUBOEKER.
Mashing-Machines for Brewers.

No. 152,403.  Patented June 23, 1874.

A. NEUBOEKER.
Mashing-Machines for Brewers.
No. 152,403. Patented June 23, 1874.
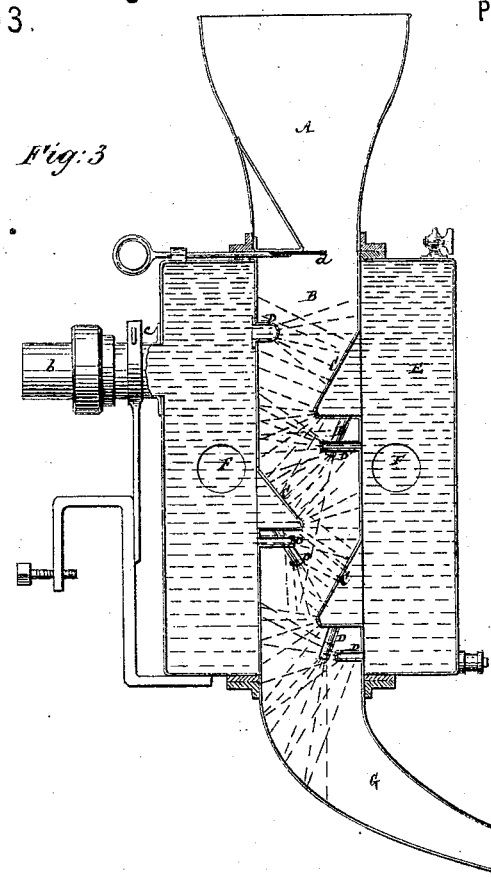
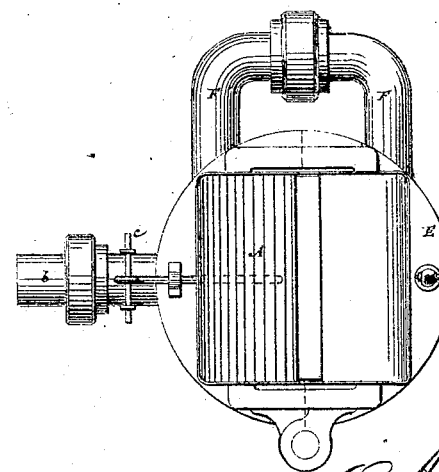
Witnesses:
Fred Hayner
Ferd Husch
Adam Neuboeker
per Brown & Allen
Attorneys

UNITED STATES PATENT OFFICE

ADAM NEUBOEKER, OF OFFENBACH-ON-MAIN, GERMANY.

IMPROVEMENT IN MASHING-MACHINES FOR BREWERS.

Specification forming part of Letters Patent No. 152,403, dated June 23, 1874; application filed October 1, 1872.

*To all whom it may concern:*

Be it known that I, ADAM NEUBOEKER, of Offenbach-on-Main, in the Grand Duchy of Hesse Darmstadt, Empire of Germany, have invented a new and useful Improvement in Mashing Machines or Apparatus; and I do hereby declare that the following is a full, clear, and exact description of the same, reference being had to the accompanying drawing forming part of this specification, and in which—

Figure 2:
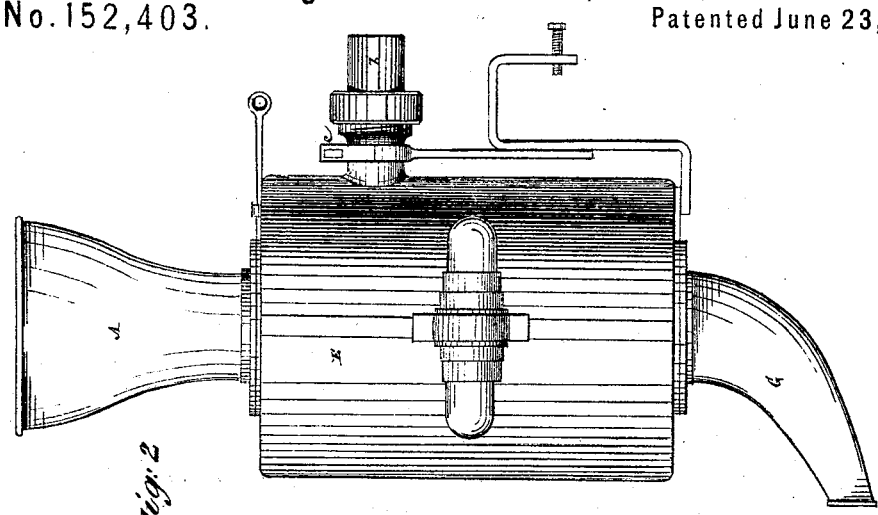
Figure 1:
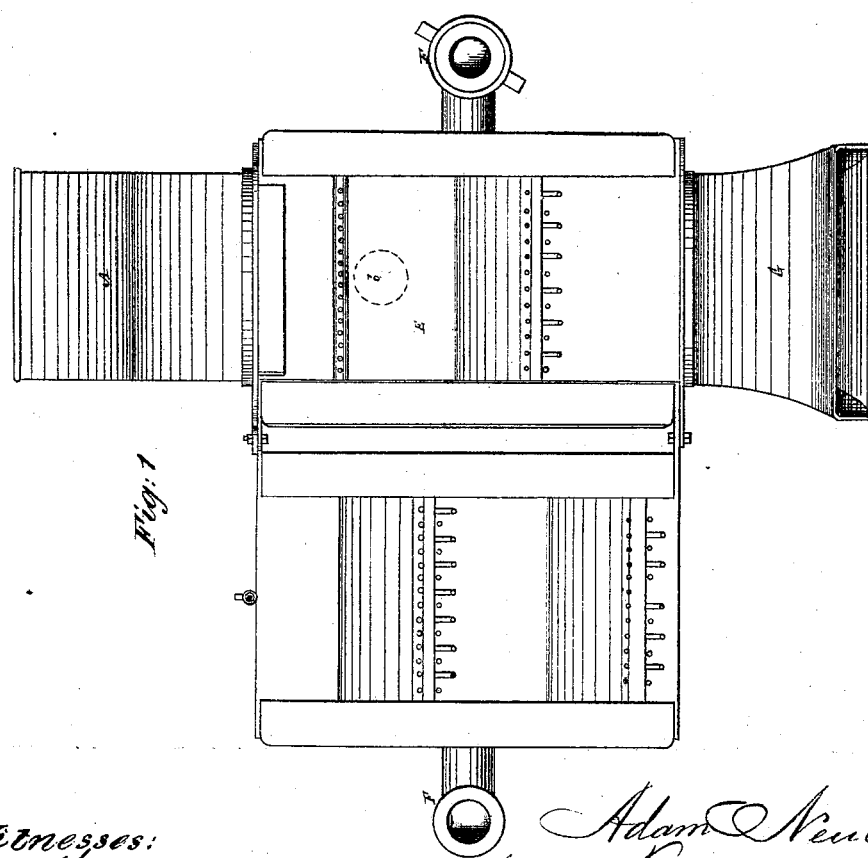

Figure 1 represents a partly sectional side elevation of an apparatus constructed in accordance with my invention; Fig. 2, an end elevation thereof; Fig. 3, a vertical transverse section, and Fig. 4 a plan of the apparatus.

Similar letters of reference indicate corresponding parts throughout the several figures of the drawing.

My invention consists in an automatic mashing apparatus for brewing purposes, whereby the malt, as it passes or falls down within a cylinder or vessel, is tossed to and fro and exposed during such passage to cross-currents of water, and the mingled mass ultimately conducted from below into the mash tun or receiver for subsequent treatment. By means of this apparatus, the mixing of the ground or crushed malt with water by hand devices or machinery, to produce the necessary decoction or infusion, may be dispensed with, and a more intimate mixture is obtained, free from gumming or the formation of lumps, which is so conspicuous in the hot-water or infusion process. Loss of the more valuable portions of the malt by the escape of dust is avoided. The apparatus is applicable to all methods of brewing, and can be easily applied to any mash-tun without interfering with the cleaning of the latter or removal of the grains from it after the wost has been run off. The mashing is effected more rapidly than heretofore, and, being uniform, a larger extract for a given quantity of malt is obtained. The whole brewing process is accelerated at a considerable saving of fuel, and every facility is afforded for observing, or correcting and regulating, the operation of mashing, without much or any liability of the apparatus, which may be made of different sizes and material, and with a greater or less number of agitating-surfaces and water-injecting orifices or tubes, to get out of order.

Referring to the accompanying drawing, A represents a funnel, into which the ground or crushed malt is fed and permitted to fall by its gravity down through a cylinder or vessel, B, in its passage through which it, simultaneously with an exposure to cross-streams of water, is tossed to and fro, and every grain most thoroughly exposed by being thrown from one to another in succession of any number of oppositely or variously disposed agitating-surfaces or inclined shelves, C, arranged one below the other. The water, of any suitable temperature, is introduced to act upon the malt while the latter is thus passing down through the vessel B by orifices or spouts D, which may point in various directions, but are arranged to inject the water under pressure in cross-streams, said water being supplied to the spouts from an outside or surrounding case or vessel, E, to which it is admitted by a pipe, *b*, that should be furnished with a valve or cock, *c*, to regulate the supply, and the hopper A, or vessel B, at its top, with a slide, *d*, for regulating the supply of malt.

The whole apparatus is constructed in two pieces or halves, to facilitate cleaning or taking apart, and said halves united by knees F, which also serve to divide, or equally distribute, the water between opposite sides of the vessel B.

In the operation of the apparatus, the malt passes through the cross-currents of water, which forcibly penetrate the mass, and, after being thoroughly mixed with the water, the whole is delivered at a uniform and suitable temperature by a spout, G, within the mash-tun. Inasmuch as, by this invention, the mashing begins before the mass reaches the tun, any desired temperature to extract the saccharine from the malt can be obtained and preserved, no heat being lost. The formation of lumps, also, due to the dextrine in the malt, and which the use of hot water in the infusion process, as distinguished from cold water in the decoction one, ordinarily increases, is, by the method herein described, avoided; the forcible injection of the water in cross-streams and tossing to and fro of the malt as it passes through the apparatus breaking up any tendency of the mass to lump.

I do not claim, broadly, the exposing of the malt or grist to cross-streams of water or sparge during its passage to the tun, as that is shown in Patent No. 45,369; but What is here claimed, and desired to be secured by Letters Patent, is—

1. A mashing apparatus constructed to operate upon the malt as it passes down through a vessel, in which it is tossed to and fro by inclines on its inner sides, and is exposed to cross-streams of water during its passage from the hopper to the tun, substantially as specified.

2. The combination of the inclined shelves C, the vessel B, and the surrounding water case or vessel E, having injection orifices or spouts D, essentially as shown and described, for the purpose set forth.

3. The vessels E B, constructed in two parts, hinged together at their one side, and connected at the opposite side by the coupling of the elbow-pipes F, as shown and described.

A. NEUBOEKER.

Witnesses:
   FRIEDR. TEPEL,
   PH. GROSS.